(12) United States Patent
Desalvo et al.

(10) Patent No.: US 10,725,541 B1
(45) Date of Patent: Jul. 28, 2020

(54) APPARATUSES, SYSTEMS, AND METHODS FOR A LAYERED CONSTRUCTION OF FLUIDIC DEVICES

(71) Applicant: Facebook Technologies, LLC, Menlo Park, CA (US)

(72) Inventors: Riccardo Desalvo, Pasadena, CA (US); Matthew Schwab, Pasadena, CA (US); Joseph Minh Tien, Alhambra, CA (US); Jack Lindsay, Seattle, WA (US); Serol Turkyilmaz, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 61 days.

(21) Appl. No.: 15/994,940

(22) Filed: May 31, 2018

(51) Int. Cl.
*G06F 3/01* (2006.01)
*G02B 27/01* (2006.01)
*G02B 26/00* (2006.01)

(52) U.S. Cl.
CPC ........... *G06F 3/014* (2013.01); *G02B 26/004* (2013.01); *G02B 27/0176* (2013.01)

(58) Field of Classification Search
None
See application file for complete search history.

(56) References Cited

U.S. PATENT DOCUMENTS

| | | | |
|---|---|---|---|
| 2012/0039770 A1* | 2/2012 | Namkoong | B01L 3/502738 422/504 |
| 2012/0182135 A1* | 7/2012 | Kusuura | G06F 3/00 340/407.1 |
| 2014/0130920 A1* | 5/2014 | Fernandes | B01L 3/502707 137/832 |
| 2014/0355101 A1* | 12/2014 | Shian | G02B 3/12 359/290 |
| 2017/0168576 A1* | 6/2017 | Keller | G06F 3/014 |
| 2018/0158367 A1* | 6/2018 | Russomanno | F15D 1/007 |

\* cited by examiner

*Primary Examiner* — Christopher R Lamb
(74) *Attorney, Agent, or Firm* — FisherBroyles, LLP

(57) ABSTRACT

Systems and methods for forming a fluidic device using a layered construction strategy may include (1) forming a first component for the fluidic device out of a first material, (2) forming a second component for the fluidic device out of a second material that is different than the first material, and (3) after forming the first and second components, forming the fluidic device by assembling a variety of components including the first component and the second component.

20 Claims, 8 Drawing Sheets

APPARATUSES, SYSTEMS, AND METHODS FOR A LAYERED CONSTRUCTION OF FLUIDIC DEVICES

BACKGROUND

Augmented reality and virtual reality systems may use wearable devices (such as a haptic glove) to give users the perception that they are interacting with virtual objects. To make such wearable devices simpler, more effective, and/or less bulky, some artificial reality systems may use a system of fluidic devices within their wearable devices. The instant disclosure identifies and addresses a need for improved apparatuses, systems, and methods for constructing such fluidic devices (e.g., fluidic devices that operate within artificial reality systems).

SUMMARY

As will be described in greater detail below, the instant disclosure describes various apparatuses, systems, and methods for forming a fluidic device using a layered construction strategy. In one example, a method for forming a fluidic device may include (1) forming a first component for the fluidic device out of a first material, (2) forming a second component for the fluidic device out of a second material that is different than the first material, and (3) after forming the first and second components, forming the fluidic device by assembling a variety of components including the first component and the second component.

In some examples, the method may further include, prior to forming the first and second components, (1) selecting the first material for the first component by selecting the first material based on a functionality of the first component and (2) selecting the second material for the second component by selecting the second material based on a functionality of the second component. In one embodiment, the first component may represent a gate configured to module fluid flow in a channel of the fluidic device. In this example, the first material may represent a flexible plastic, such as a silicone elastomer.

In an additional or alternative example, the second component may represent a channel configured to transport fluid from a source, configured to act as an input for fluid to enter the channel, to a drain, configured to act as an output for fluid to exit the channel. In this example, the second material may represent a collapsible material, such as a stretched polyester film.

In some embodiments, forming the first component out of the first material may include using a first process to form the first component and forming the second component out of the second material may include using a second process to form the second component that is different than the first process. In some examples, the method may further include forming a third component for the fluidic device out of a third material. In these examples, the components that are assembled to form the fluidic device may further include the third component. In one such example, the third component may represent a force concentrator and/or a casing. In this example, the third material may represent a rigid plastic.

In addition, a corresponding fluidic device may include (1) a channel configured to transport fluid from a source to a drain and (2) a gate configured to modulate fluid flow in the channel. The source may represent an input for the fluid to enter the channel, and the drain may represent an output for fluid to exit the channel. The fluidic device may have been formed by (1) forming the gate from a first material and the channel from a second material that differs from first material and (2) after forming the gate and the channel, forming the fluidic device by assembling a variety of components including the channel and the gate.

In one embodiment, the fluidic device may further include a force concentrator. The force concentrator may have a force reception surface that abuts a gate actuation membrane of the gate and a force concentration surface that is smaller than the force reception surface and that abuts the channel. In this embodiment, (1) forming the fluidic device may also include forming the force concentrator from a third material that differs from the first material and the second material and (2) the components assembled to form the fluidic device further may further include the force concentrator.

In addition, a corresponding haptic device may include a fluidic device with one or more of the features described above that was formed using one or more of the methods described above. In one example, the haptic device may also include an actuator, a controller, and one or more sensors. In this example, at least one of the actuator, the controller, or the one or more sensors may be composed of a group of fluidic devices that includes the fluidic device.

In some embodiments, the group of fluidic devices may be coupled together to form a composite fluidic device. In some examples, the haptic device may include a haptic glove configured to operate within a virtual reality system. In these examples, the virtual reality system may include (1) a head-mounted display, (2) an imaging device, (3) the haptic device, and (4) a console machine coupled to the head-mounted display, the imaging device, and the haptic device. In one embodiment, the haptic device may be configured to (1) send action requests, initiated by a user wearing the haptic glove, to the console machine and (2) provide haptic feedback, based on a haptic feedback signal received from the console machine, to the user as the user interacts with virtual objects in the virtual reality system.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
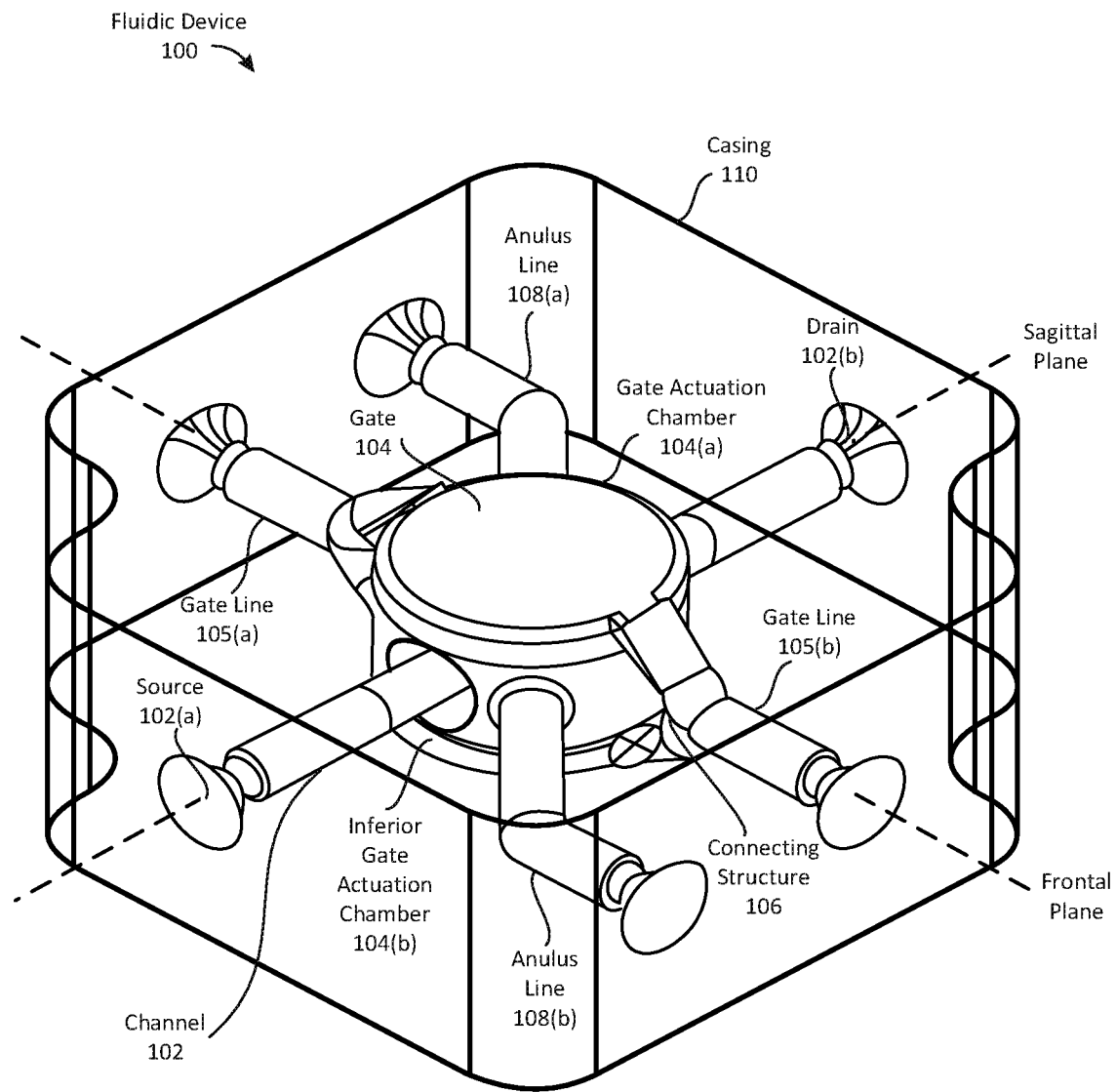
FIG. 1 is a perspective view of an exemplary fluidic device that may be formed in accordance with a layered construction approach.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to apparatuses, systems, and methods for forming a fluidic device using a layered construction strategy. As will be explained in greater detail below, embodiments of the instant disclosure may include analyzing various components (i.e., layers) to be positioned within a fluidic device and selecting a different material for two or more of the analyzed components based on the functionality performed by the component. Then, instead of forming a fluidic device in a single step (e.g., using a one-step wax molding process), each component may be formed separately with its selected material and then assembled (e.g., by stacking layer upon layer).

The following will provide, with reference to FIGS. 1 and 2A-2C and 4-5, detailed descriptions of a fluidic device that may be formed using a layered construction strategy. FIG. 3 will provide detailed descriptions of methods for forming a fluidic device using a layered construction strategy. The discussion corresponding to FIGS. 6-8 will provide detailed descriptions of an artificial reality environment in which the exemplary fluidic devices may operate.

FIG. 1 illustrates a perspective view of an exemplary fluidic device 100 that may be formed in accordance with the disclosed layered construction approach. Fluidic device 100 generally represents any type or form of fluid handling device that controls fluid flow in a channel from a source to a drain. Examples of fluidic device 100 include, without limitation, a fluidic pump and/or a latch gate.

Figure 2A:
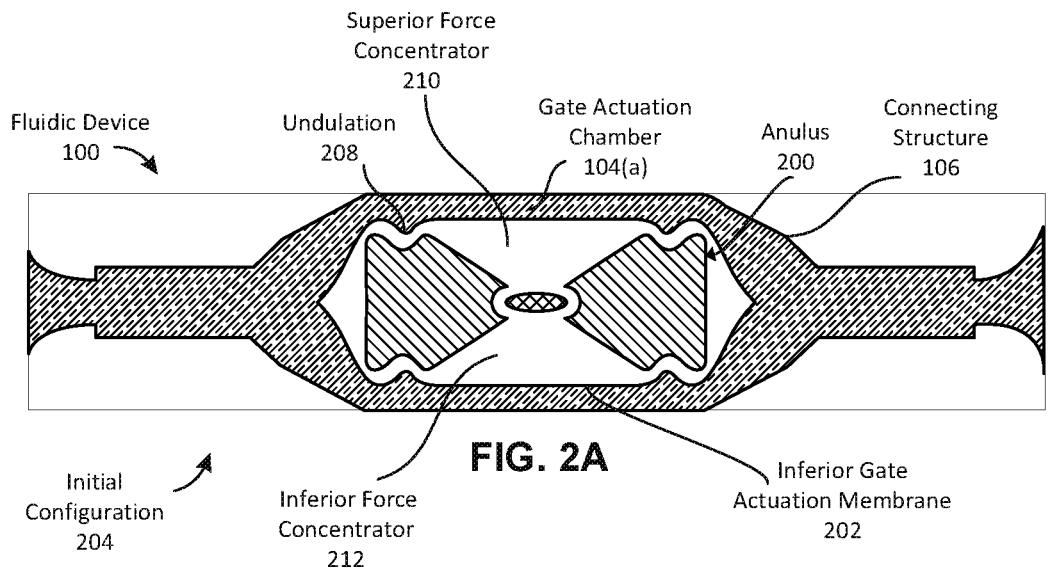
FIG. 2A is cross-sectional view of the exemplary fluidic device illustrated in FIG. 1, as viewed from a frontal plane, when a gate actuation membrane of the exemplary fluidic device is in an initial configuration.
Figure 2B:
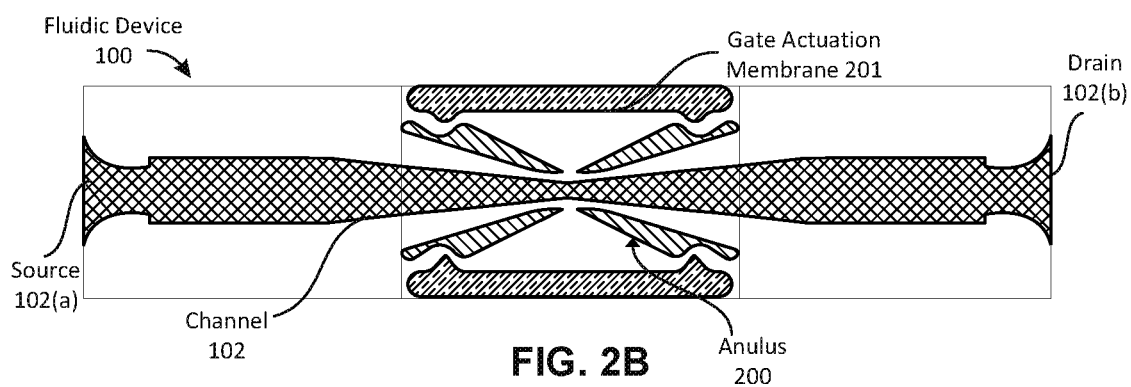
FIG. 2B is a cross-sectional view of the exemplary fluidic device illustrated in FIG. 1, as viewed from a sagittal plane.
Figure 3:
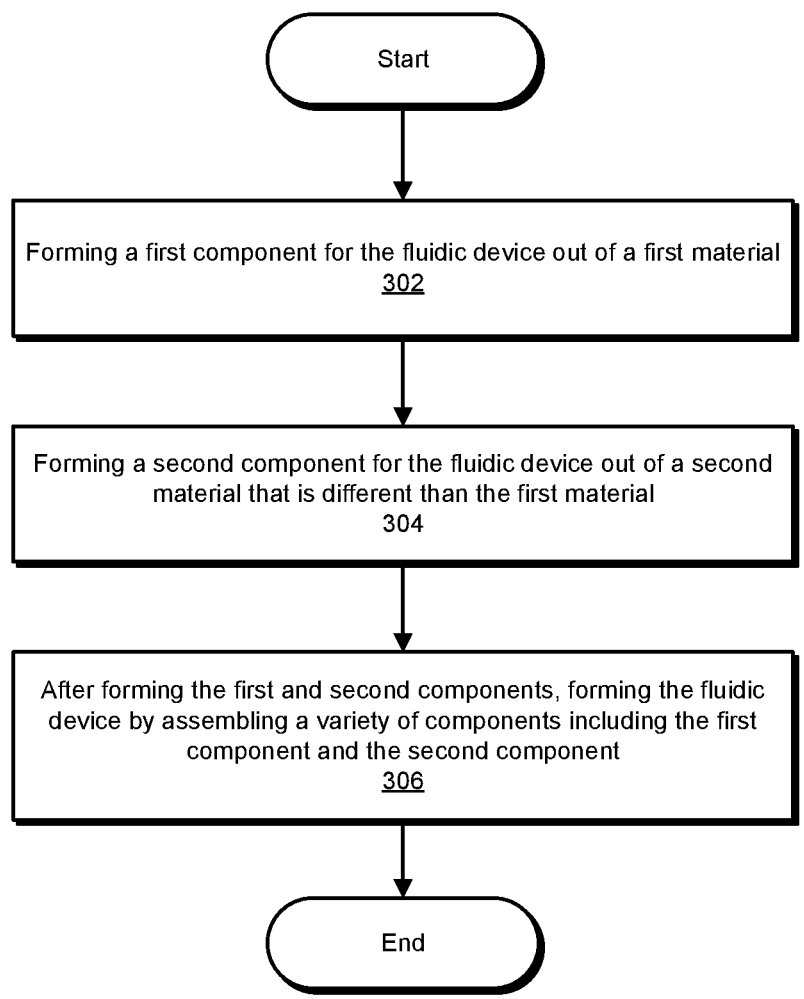
FIG. 3 is a flow diagram of an exemplary method of forming a fluidic device using a layered construction strategy.

Cross-sectional views of fluidic device 100 are illustrated in FIG. 2A, which shows a cross-sectional view of fluidic device 100 from a frontal plane, and FIG. 2B, which shows a cross-sectional view of fluidic device 100 from a sagittal plane. In some examples, a rate and/or volume of fluid flowing through fluidic device 100 may be variable. In these examples, fluidic device 100 may alternate between an open state, in which fluid is flowing through the channel, and a closed state, in which fluid is not flowing through the channel and/or is flowing below a threshold amount.

In some embodiments, fluidic device 100 may be interconnected with other fluidic devices to form a composite fluidic device. In some examples, the composite fluidic device may function in a manner analogous to an electronic device (e.g., the composite fluidic device may include and/or operates as a fluidic field effect transistor, a fluidic diode, a fluidic resistor, a fluidic capacitor, etc.). In one such example, fluidic device 100 may function as a fluidic logic device (e.g., an inverter, OR gate, etc.) in tandem with other fluidic logic devices, forming a fluidic circuit in which fluid flow in one fluidic logic device controls the fluid flow of other fluidic logic devices.

In examples in which a composite fluidic device functions as an electronic device, the functionality of the composite fluidic device may depend on the combination and ordering of fluidic logic devices used within the composite fluidic device. For example, just as an electronic transistor may be built using a combination of different electronic logic gates in a predetermined order, a fluidic transistor may be built using a combination of different fluidic logic gates in a predetermined order.

In some examples, multiple fluidic circuits may be combined in a form of large scale integration (LSI). In one such example, a fluidic LSI may be used as a haptic assembly in a wearable device (e.g., in an artificial reality system. In these examples, composite fluidic devices may operate as part of a variety of haptic components within the haptic assembly, such as a controller, an actuator, and/or a sensor, as will be described in greater detail below in connection with FIGS. 6-8.

Figure 2C:
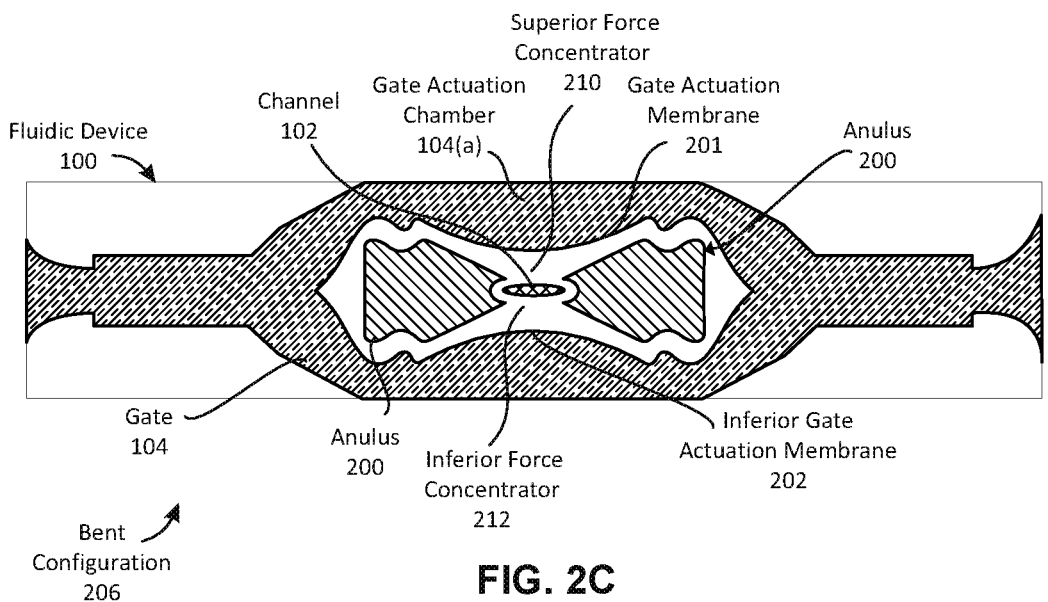
FIG. 2C is a cross-sectional view of the exemplary fluidic device illustrated in FIG. 1, as viewed from a frontal plane, when a gate actuation membrane of the exemplary fluidic device is in a bent configuration.

As shown in FIG. 1 (and in FIGS. 2A-2C), fluidic device 100 may include (1) a channel 102, (2) a gate 104 configured to modulate fluid flow through channel 102, and—in some embodiments—(3) an anulus, which may cause a force concentrator to actuate downward to compress channel 102. The anulus is not shown in FIG. 1, but may be connected to anulus lines 108(a) and 108(b) illustrated in FIG. 1 and is illustrated as anulus 200 in FIGS. 2A-2B. Each of these elements is also illustrated from a frontal view in FIGS. 2A and 2C and a sagittal view in FIG. 2B. In FIGS. 2A-2C, channel 102 is shaded using cross-hatch lines, gate 104 is shaded using lines that slope upward, and anulus 200 is shaded using lines that slope downward. Each of these elements (i.e., channel 102, gate 104, and anulus 200) will be discussed in turn.

First, channel 102 generally represents any type or form of conduit configured to transport fluid from a source 102(a) to a drain 102(b). Source 102(a) may serve as an input for fluid to enter channel 102 and drain 102(b) may serve as an output for fluid to exit channel 102. In one example, channel 102 may be configured to transport fluid in the form of a liquid. In an additional or alternative example, channel 102 may be configured to transport fluid in the form of a gas. In some examples, channel 102 may represent a microchannel (e.g., measuring a millimeter or less in diameter). In one embodiment, channel 102 may be made of a compressible material. In this embodiment, a rate and/or volume of fluid flowing through channel 102 may depend on the degree to which channel 102 is compressed.

Next, gate 104 generally represents any type or form of assembly configured to modulate fluid flow through a channel in a fluidic device (e.g., by modulating a rate and/or volume of fluid flowing through the channel). As shown in FIG. 1, gate 104 may include a gate actuation chamber 104(a), positioned above channel 102, and an inferior gate actuation chamber 104(b), positioned below channel 102. The two gate actuation chambers may be connected using a connecting structure, such as connecting structure 106 and may also be connected to a gate line 105(a) and a gate line 105(b). The bottom of gate actuation chamber 104(a) may be defined by a gate actuation membrane (not shown in FIG. 1 but shown as gate actuation membrane 201 in FIG. 2). Similarly, the bottom of inferior gate actuation chamber 104(b) may be defined by a gate actuation membrane (shown as inferior gate actuation membrane 202 in FIG. 2).

Gate 104 may modulate fluid flow through channel 102 in a variety of ways. In one example, gate 104 may cause channel 102 to reversibly compress, causing fluid flow to alternate between a first fluid flow when the channel is uncompressed and a second fluid flow when the channel is compressed.

In one embodiment, gate 104 may cause channel 102 to reversibly compress by bending gate actuation membrane 201, as illustrated in FIGS. 2A and 2C. In this embodiment, gate actuation membrane 201 may alternate between an initial configuration 204, illustrated in FIG. 2A, that does not interfere with a cross section of channel 102, and a bent configuration 206, illustrated in FIG. 2C, that causes the cross section to reversibly compress.

In some examples, gate actuation membrane 201 may include an undulation (e.g., undulation 208 in FIG. 2A) that facilitates the bending of gate actuation membrane 201. The term undulation, in some embodiments, generally refers to any type or form of shape formed in a portion of a membrane that reduces stretching or facilitates more efficient actuation of the membrane. Examples of undulated shapes include, without limitation, a wave-shape, a u-shape, a v-shape, a w-shape, an s-shape, etc. In some embodiments, undulation 208 may add extra length to gate actuation membrane 201. The extra length may allow gate actuation membrane 201 to bend without stretching the material that forms gate actuation membrane 201 more than a threshold amount.

Gate actuation membrane 201 may bend in response to a variety of events. For example, gate actuation membrane 201 may bend in response to an increase in fluid pressure applied to gate actuation membrane 201. In this example, gate actuation chamber 104(a) may be configured with an adjustable volume. The volume in gate actuation chamber 104(a) may expand with fluid pressure (e.g., as a result of fluid flowing from gate line 105(a) to gate line 105(b)). In this embodiment, a low pressure state of gate actuation chamber 104(a) may correspond to a first chamber size (e.g., in which gate actuation membrane 201 rests in initial configuration 204, as illustrated in FIG. 2A). A high pressure state of gate actuation chamber 104(a) may correspond to a second chamber size, which may be larger than the first chamber size (as illustrated in FIG. 2C). The expansion of gate actuation chamber 104(a) into the second chamber size may displace gate actuation membrane 201, toward channel 102, into bent configuration 206 such that gate actuation membrane 201 causes the cross section of channel 102 to compress. In some embodiments, the term "low pressure" generally refers to a pressure of a fluid that falls below a designated pressure level and the term "high pressure" generally refers to a pressure of a fluid that falls above the designated pressure level.

In one embodiment, initial configuration 204 may cause channel 102 to adopt an open state and bent configuration 206 may cause channel 102 to transition to a closed state. In some embodiments, an "open" state generally refers to a state in which fluid within channel 102 is flowing from source 102(a) to drain 102(b) at or above a designated flow rate. In contrast, a "closed" state may generally refer to a state in which fluid within channel 102 is flowing below the designated flow rate.

In one example, gate actuation membrane 201 may, in its bent configuration, press directly on channel 102, causing channel 102 to compress. In another example, gate actuation membrane 201 may, in its bent configuration, press on a component of fluidic device 100 that abuts channel 102, such as a force concentrator and/or anulus 200.

For discussion purposes, this disclosure has focused on embodiments in which gate actuation membrane 201 alternates between an initial configuration and a bent configuration. However, in additional or alternative embodiments, inferior gate actuation membrane 202 may alternate between an initial configuration and a bent configuration in response to the same events and/or causing the same results.

Figure 4:
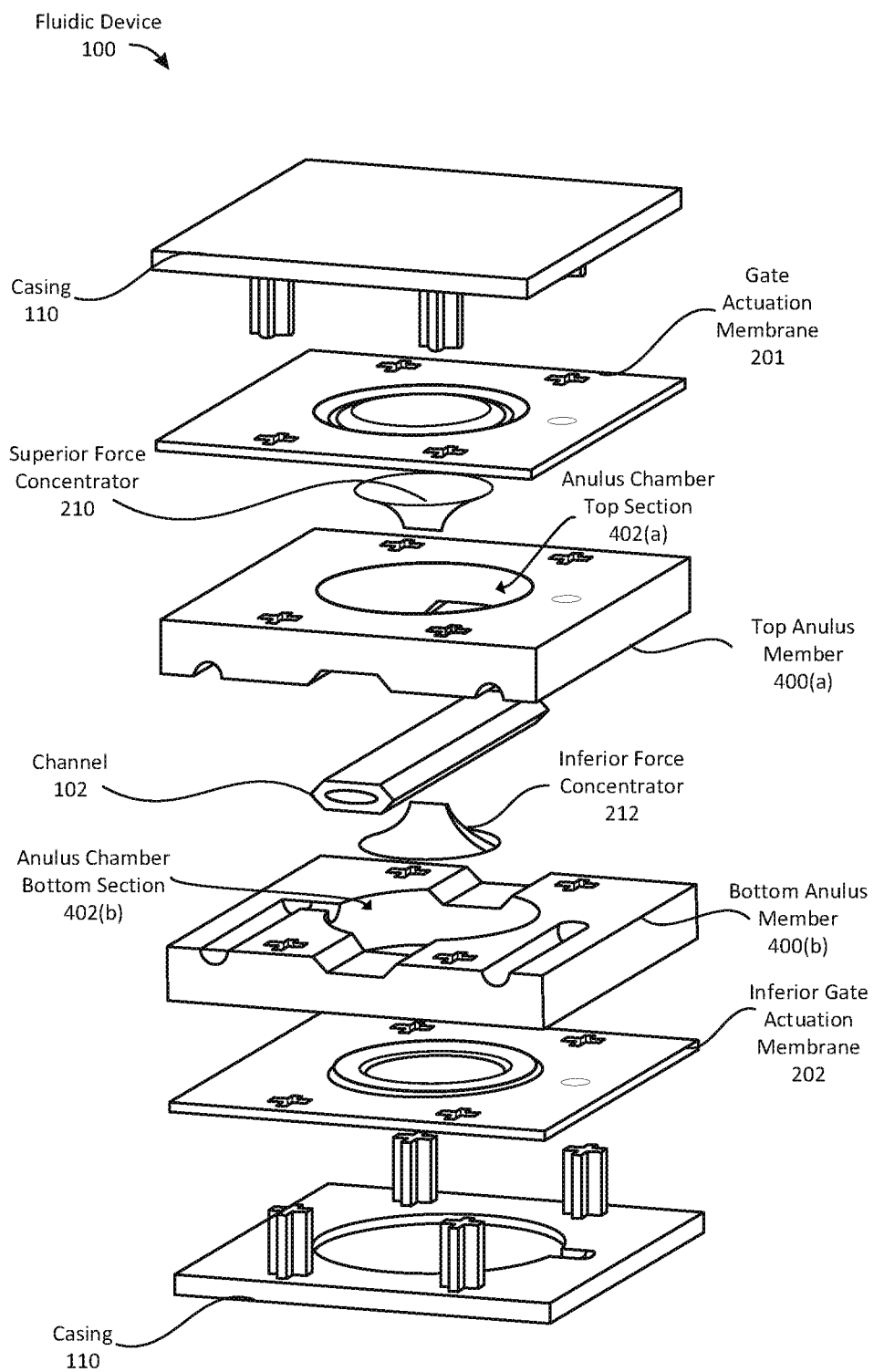
FIG. 4 is a perspective view of various layered components of an exemplary fluidic device, prior to being assembled.

Finally, in some embodiments, anulus 200 generally represents any type or form of collapsible chamber that may cause (e.g., by collapsing) a force concentrator (such as superior force concentrator 210 and/or inferior force concentrator 212 illustrated in FIGS. 2A-2C) to actuate downward or upward. In one example, as illustrated in FIG. 4, anulus 200 may include (1) a top anulus member 400(a) with an anulus chamber top section 402(a) and (2) a bottom anulus member 400(b) with an anulus chamber bottom section 402(b). In this example, top anulus member 400(a) may cause superior force concentrator 210 to actuate downward and/or bottom anulus member 400(b) may cause inferior force concentrator 212 to actuate upward.

In one embodiment, anulus 200 may represent a fluid-filled chamber and may collapse when fluid is ejected from the chamber. In some examples, top anulus member 400(a) 200 may be positioned below gate actuation membrane 201 and/or bottom anulus member 400(b) may be positioned above inferior gate actuation membrane 202. In these examples, top anulus member 400(a) may collapse when gate actuation membrane 201 adopts bent configuration 206, which may in turn cause superior force concentrator 210 to actuate downward. Similarly, bottom anulus member 400(a) may collapse when inferior gate actuation membrane 202 adopts bent configuration 206, which may in turn cause inferior force concentrator 212 to actuate upward. By actuating downward or upward, superior force concentrator 210 and/or inferior force concentrator 212 may reversibly press on channel 102 to cause channel 102 to compress (e.g., as shown in FIGS. 2A and 2C). In some embodiments, superior force concentrator 210 and/or inferior force concentrator 212 may each include two parallel surfaces: (1) a force reception surface that abuts gate actuation membrane 201 or inferior gate actuation membrane 202 and (2) a force concentration surface that abuts channel 102. The force concentration surface may be smaller than the force reception surface. As such, top anulus member 400(a) and bottom anulus member 400(b) may apply pressure to the larger force reception surfaces when collapsed, as illustrated in FIG. 2C. This may cause superior force concentrator 210 and/or inferior force concentrator 212 to move toward channel 102 and press on channel 102, applying the concentrated force of each smaller force concentration surface to channel 102.

FIG. 3 is a flow diagram of an exemplary computer-implemented method 300 for forming a fluidic device, such as fluidic device 100, using a layered construction strategy. As illustrated in FIG. 1, at step 302, method 300 may include forming a first component for a fluidic device, such as fluidic device 100, out of a first material. Then, at step 304, method 300 may include forming a second component for a fluidic device, such as fluidic device 100, out of a second material that is different than the first material. In some examples, method 300 may further include creating a third component from a third material that is different than both the first material and the second material.

Prior to forming the first and second components (and, in embodiments that include a third component, the third component), the material for each component may be individually selected. The first material may be selected based on a functionality of the first component, the second material may be selected based on a functionality of the second component, and—in embodiments that include a third component—the third component may be selected based on a functionality of the third component.

To give a specific example, the first component may represent a gate, such as gate 104 shown in FIG. 1. In this specific example, the first material may be selected based on a functionality of gate 104. For example, because gate 104 may be configured to alternate between initial configuration 204 and bent configuration 206 (shown in FIG. 2), a material that bends and/or stretches may be selected for forming gate 104. Thus, in this example, a flexible plastic, such as a silicone elastomer (e.g., silicone rubber), may be selected to use for forming gate 104.

Continuing with the specific example, the second component may represent a channel, such as channel 102 shown in FIG. 1. Consequently, the second material may be selected based on a functionality of channel 102. For example, because channel 102 may be configured to compress, a compressible material that will withstand compression (e.g., without tearing) may be selected to use for forming channel 102. Thus, in this example, a collapsible material, such as a stretched polyester film (e.g., Mylar), may be selected to use for forming channel 102.

Continuing with the specific example, in embodiments that include a third component, the third component may represent a force concentrator, such as superior force concentrator 210 and/or inferior force concentrator 212. In these embodiments, the third material may be selected based on a functionality of superior force concentrator 210 and/or inferior force concentrator 212. For example, because superior force concentrator 210 and/or inferior force concentrator 212 may be configured to press on channel 102 (in order to cause channel 102 to compress), a sturdy material such as a rigid plastic may be selected to use for forming superior force concentrator 210 and/or inferior force concentrator 212. In other examples, the third component may represent a casing, such as casing 110 shown in FIG. 1. In these embodiments, the third material may be selected based on a functionality of casing 110. For example, because casing 110 may be configured to hold the other components in place while withstanding being moved about (e.g., in instances in which fluidic device 100 is positioned within a haptic glove), a sturdy material, such as a rigid plastic, may be selected to use for forming casing 110.

In some examples, the first and second components (e.g., gate 104 and channel 102 in the specific example), may each be formed separately. For example, the first component may be formed (i.e., out of the first material) using a first process and the second component may be formed (i.e., out of the second material) using a second process. In one embodiment, the second process may be different than the first process. For example, as opposed to placing a single material (e.g., a heated thermoplastic polymer) into a single wax mold that molds both gate 104 and channel 102, gate 104 may be formed using a first process and channel 102 may be formed using a separate second process. Similarly, the third component may be formed using a third process that may be different from the first process and/or the second process.

Each component may be formed using a variety of processes. For example, in embodiments in which the first component represents gate 104, gate 104 may be formed by (1) heating a flexible plastic such as a silicone elastomer and (2) placing the heated plastic into a gate-shaped mold. Similarly, in embodiments in which the second component represents channel 102, channel 102 may be formed by (1) heating a stretched polyester film and (2) placing the heated elastomer into a channel-shaped mold. Similarly, in embodiments in which a third component represents a force concentrator and/or casing 110, the force concentrator and/or casing 110 may be formed by (1) heating a rigid plastic and (2) placing the heated elastomer into an force concentrator-shaped mold and/or casing-shaped mold, respectively.

In an additional or alternative example, the first component may be formed by cutting one or more subcomponents from a larger sheet of the first material (e.g., and then gluing and/or welding the subcomponents together). Similarly, the second component may be formed by cutting one or more subcomponents from a larger sheet of the second material (e.g., and then gluing and/or welding the subcomponents together). Similarly, a third component may be formed by cutting one or more subcomponents from a larger sheet of a third material (e.g., and then gluing and/or welding the subcomponents together).

In some examples, the process used to form one component would be problematic to use as a process for another component. For example, in embodiments in which gate actuation membrane 201 includes an undulation (e.g., undulation 208 shown in FIG. 2A), the undulation may be difficult and/or impossible to form using a wax molding. Thus, in these embodiments, conventional single-wax-mold techniques may be incompatible with at least one feature of the fluidic device. By separately forming each component of the fluidic device and then assembling the separately formed components, the disclosed systems and methods may improve and/or optimize the process used to form each component to be compatible with the features of the component being formed.

In addition to forming various components separately, in one embodiment, subcomponents within a component may also be formed separately and the materials for the various subcomponents may be different. For example, in one example, undulation 208 (shown in FIG. 2A) and the rest of gate actuation membrane 201 may be formed from different materials. In this example, undulation 208 may be formed separately from the rest of gate actuation membrane 201 and then assembled. In alternative embodiments, undulation 208 may be formed from a same material as the rest of gate actuation membrane 201, as described previously.

After forming the various components (e.g., the components formed in steps 302 and 304), at step 306, method 300 may include forming the fluidic device by assembling the various components. The components may be assembled in a variety of ways. In one example, the components may be adhered to one another (e.g., using an adhesive such as a glue). Additionally or alternatively, the components may be welded together. In some embodiments, two or more of the components be configured to interlock (e.g., snapping into place).

Figure 5A:
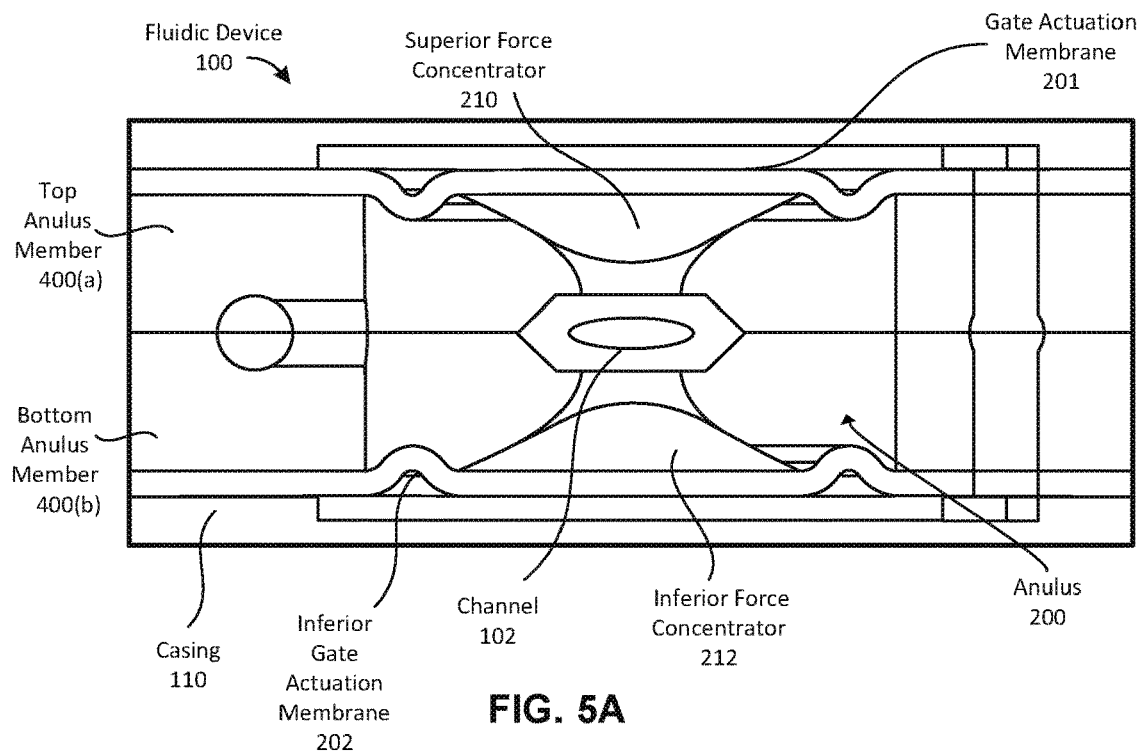
FIGS. 5A-5B are perspective views of an exemplary assembled exemplary fluidic device.
Figure 5B:
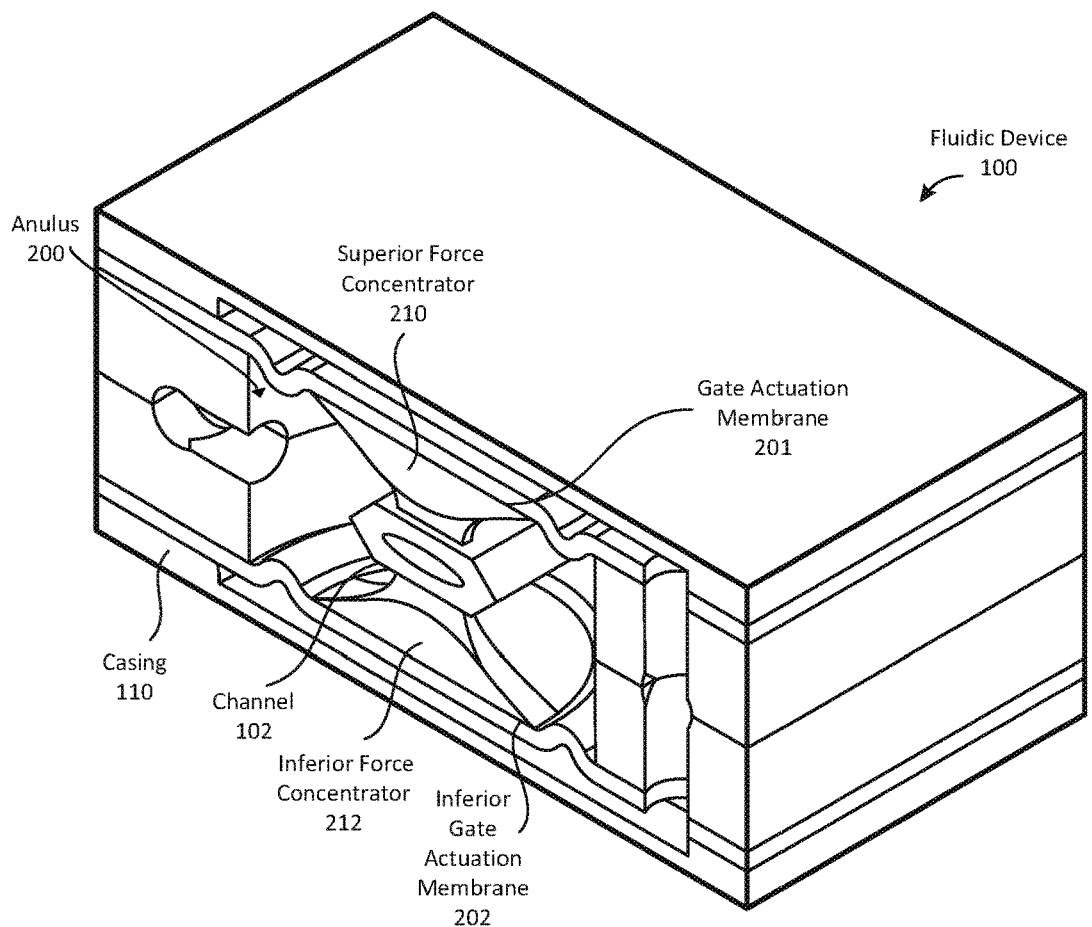

In one example, each component within fluidic device 100 may be conceptualized as a layer, as illustrated in FIG. 4. In this example, fluidic device 100 may be formed by positioning each layer above and/or beneath its neighboring layer and then coupling the layers one to another, resulting in fluidic device 100 as illustrated in FIGS. 5A-5B.

For discussion purposes, this disclosure has focused on embodiments in which two or three components are separately formed and then assembled. However, the layered construction strategy disclosed herein may include separately forming any number of components and then assembling the components that were separately formed.

After fluidic device 100 is formed, fluidic device 100 (e.g., operating as part of a fluidic circuit) may be used to accomplish a variety of functionalities. In one example, fluidic device 100 may be used in a haptic device in an artificial reality system, in place of an electronic device. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality.

Figure 6:
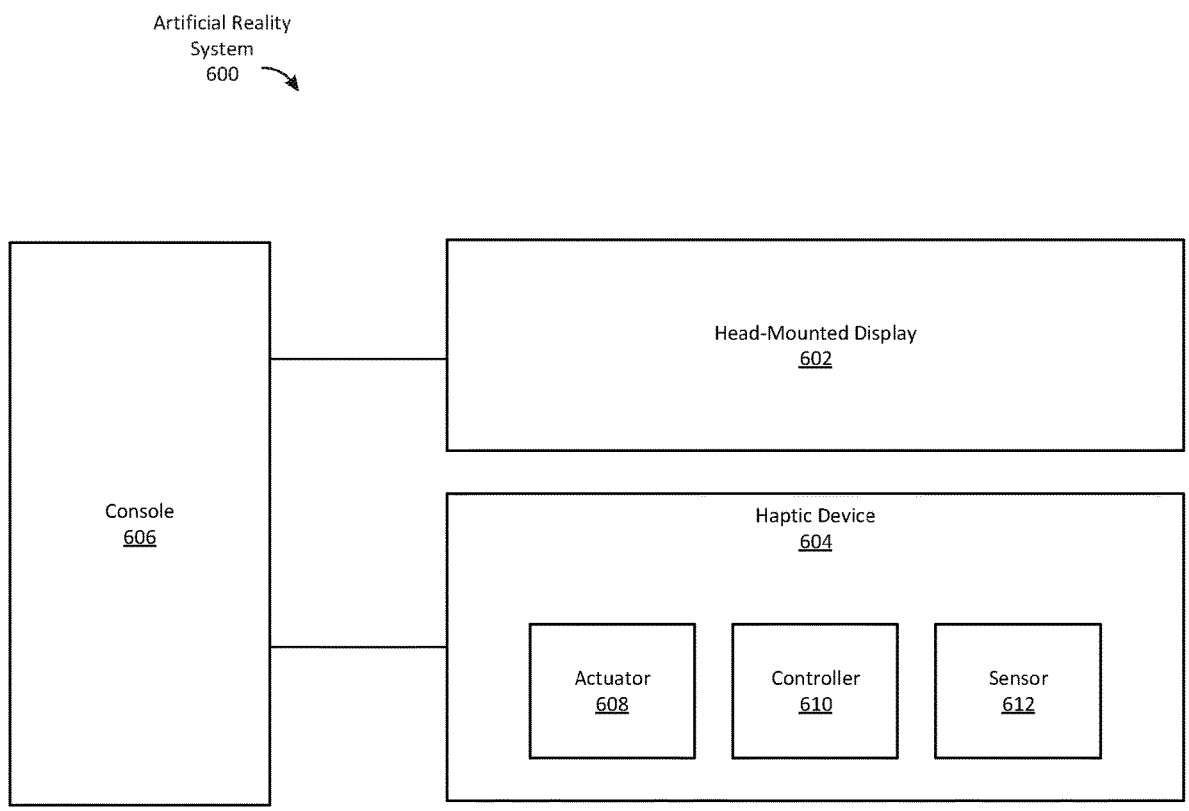
FIG. 6 is a block diagram of an exemplary artificial reality system that includes one or more fluidic devices, such as the fluidic device illustrated in FIG. 1.
Figure 7:
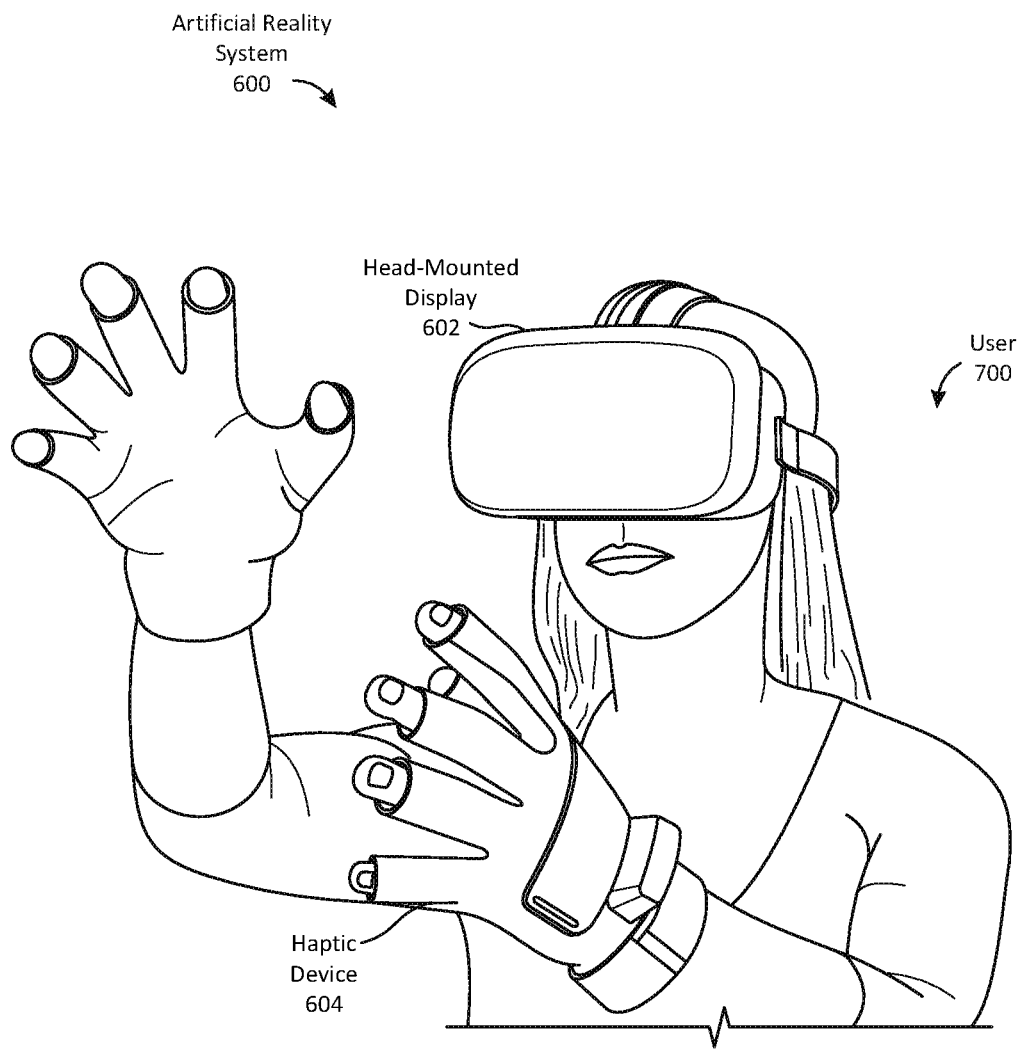
FIG. 7 is a perspective view of a user wearing an exemplary head-mounted display and an exemplary haptic glove within an artificial reality system, such as the exemplary artificial reality system depicted in FIG. 6.

FIG. 6 is a block diagram of an exemplary artificial reality system 600 that includes a head-mounted display 602 and a haptic device 604, each of which may be coupled to a console 606. In this example, a user may wear head-mounted display 602 around his or her head and/or may wear haptic device 604 (e.g., as a glove on one or both hands), as illustrated in FIG. 7. FIG. 7 is a perspective drawing of an exemplary embodiment of artificial reality system 600 in which a user 700 is wearing an exemplary embodiment of head-mounted display 602 and haptic device 604.

While FIG. 6 shows an example artificial reality system including one head-mounted display and one haptic assembly, and FIG. 7 shows an example artificial reality environment including one head-mounted display and two haptic devices, in other embodiments any number of these components may be included in an artificial reality system. For example, in some embodiments there may be multiple head-mounted displays each having an associated haptic device, with each head-mounted display and each haptic device communicating with the same console.

Head-mounted display 602 generally represents any type or form of assembly configured to present media representing an artificial reality to a user wearing the assembly. Examples of media presented by head-mounted display 602 include, without limitation, one or more images, video, and/or audio. In one example, audio may be presented via an external device (e.g., speakers and/or headphones) that receives audio information from head-mounted display 602 and/or console 606 and presents audio data via the external device based on the audio information.

In some embodiments, head-mounted display 602 may represent a virtual reality headset. In these embodiments, head-mounted display 602 may present views (e.g., images, video, sound, etc.) of a computer-generated reality. Additionally or alternatively, head-mounted display 602 may represent an augmented reality (AR) and/or mixed reality (MR) headset. In these embodiments, head-mounted display 602 augments views of a physical, real-world environment with computer-generated elements (e.g., images, video, sound, etc.).

Haptic device 604 generally represents any type or form of wearable device, worn by a user within an artificial reality system, that provides haptic feedback to the user to give the user the perception that he or she is physically engaging with a virtual object. In some embodiments, haptic device 604 may provide haptic feedback by applying a vibration, motion, and/or force to the user. For example, haptic device 604 may limit or augment a user's movement. To give a specific example, haptic device 604 may limit a user's hand from moving forward so that the user has the perception that his or her hand has come in physical contact with a virtual wall. In this specific example, one or more actuators within the haptic advice may achieve the physical movement restriction by pumping fluid into an inflatable bladder of the haptic device. In some examples, a user may also use haptic device 604 to send action requests to console 606. Examples of action requests include, without limitation, requests to start an application and/or end the application and/or requests to perform a particular action within the application.

In some embodiments, haptic device 604 may include a combination of various coupled fluidic devices (i.e., a composite fluidic device as described above in connection with FIG. 1). In one example, a circuitry within haptic device 604 may consist exclusively of fluidic devices. Alternatively, the circuitry within haptic device 604 may include a combination of fluidic devices and electrical devices, forming a combined fluidic/non-fluidic haptic device. The composite fluidic devices may be used to perform a variety of actions. For example, a composite fluidic device may operate as a controller 610 (e.g., addressing actuators included in haptic device 604 according to a haptic feedback signal from console 606). In another example, a composite fluidic device may act as a sensor 612 and/or as an actuator 608 within haptic device 604.

Figure 8:
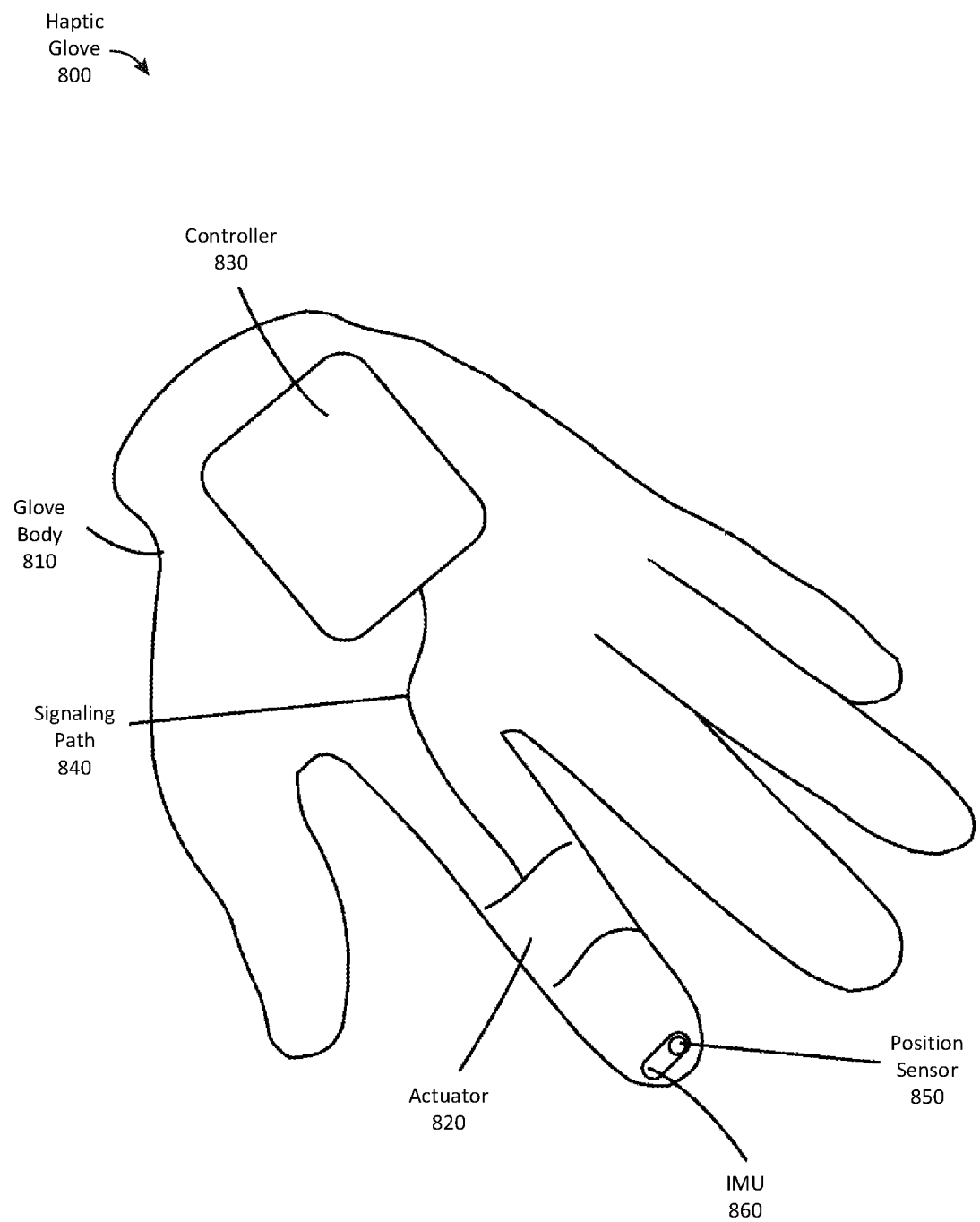
FIG. 8 is a perspective view of the exemplary haptic glove depicted in FIG. 6.

To give a specific simplified example of a fluidic circuitry operating within a haptic device, FIG. 8 illustrates an exemplary haptic glove 800 with an assembly of interconnected fluidic devices configured to perform a variety of tasks. As shown in FIG. 8, haptic glove 800 may be formed by a glove body 810. In some examples, glove body 810 may represent a garment and may be coupled to an assembly of haptic components such as an actuator 820, a controller 830, a signaling path 840, a group of position sensors (including position sensor 850), and/or one or more inertial measurement units (IMU) (including IMU 860).

In some embodiments, one or more of these haptic components may be placed beneath an outer surface of glove body 810, shielded from view. Additionally or alternatively, one or more of the haptic components may be placed on an outer surface of glove body 810, such that the haptic components are visually detectable. In one example, position sensor 850 may be coupled to a portion of glove body 810 corresponding to a fingertip, as shown in FIG. 7. In this embodiment, (1) actuator 820 may be coupled to a portion of glove body 810 corresponding to a finger joint, (2) controller 830 may be coupled to a portion of glove body 810 corresponding to a dorsal side of a hand, and (3) signaling path 840 may be coupled between controller 830 and actuator 820, as shown in FIG. 8.

In one example, the haptic assembly in FIG. 8 may be configured to collect location and/or motion data describing a physical position and/or movement of haptic glove 800. In this example, position sensor 850 may generate measurement signals in response to motion of haptic glove 800. Position sensor 850 may, in some embodiments, represent an accelerometer and/or a gyroscope that has at least one fluidic component. After generating the measurement signals, position sensor 850 may transmit the measurement signals to IMU 860. Then, IMU 860 may rapidly sample the measurement signals (e.g., from position sensor 850 and other position sensors within haptic glove 800) and calculate the estimated position of haptic glove 800 from the sampled measurements or transmit the sampled measurements to the console for the console to calculate the estimated position of haptic glove 800. In this example, position sensor 850 and/or IMU 860 may be composed, at least in part, of one or more fluidic devices (including, e.g., fluidic device 100).

In another example, the haptic assembly in FIG. 8 may be configured to instruct haptic glove 800 to perform specific functions (e.g., based on instructions received from a console such as console 606 in FIG. 6). In this embodiment, controller 830 may receive instructions (e.g., via a haptic feedback signal) from console 606 and actuate haptic glove 800 according to the instructions via one or more actuators (such as actuator 820). For example, controller 830 may instruct actuator 820 (e.g., via signaling path 840) to pump fluid into an inflatable bladder to achieve a physical movement restriction. In this example, controller 830 and/or actuator 820 may be composed, at least in part, of a group of composable fluidic devices (including, e.g., fluidic device 100).

As discussed throughout the instant disclosure, the disclosed systems, methods, and devices may provide a layering strategy for fluidistors to be used in wearable fabric (e.g., a haptic device). Instead of manufacturing a fluidistor as a single unit out of one material (e.g., using wax molding), the various layers of the fluidistor (e.g., a feed tube, a gate, a force concentrator) may be manufactured separately and then assembled. This manufacturing approach may allow for the material of each layer to be optimized for the functionality of that layer. For example, a gate actuation member, which may be used to compress a feed tube, may be made of a thin, flexible, sturdy material (such as Mylar). The feed tube may be made of a collapsible material (such as stretched polyester film). Other components (such as the casing and/or a force concentrator) may be made of a rigid plastic. After assembling the layers of the fluidistor, the fluidistor may be embedded into wearable fabric (e.g., a haptic device, such as a haptic glove).

The foregoing description, for purposes of explanation, has been described with reference to specific embodiments and has been provided to enable others skilled in the art to best utilize various aspects of the example embodiments disclosed herein. However, the illustrative discussions above are not intended to be exhaustive or to limit the scope of the claims to the precise forms disclosed. Many modifications and variations are possible in view of the above teachings without departing from the spirit and scope of the instant disclosure. The instant disclosure covers all modifications, equivalents, and alternatives falling within the scope of the appended claims. Features from any of the above-mentioned embodiments may be used in combination with one another in accordance with the general principles described herein. The embodiments were chosen to best explain the principles underlying the claims and their practical applications, to thereby enable others skilled in the art to best use the embodiments with various modifications as are suited to the particular uses contemplated. The embodiments disclosed herein should be considered in all respects illustrative and not restrictive. Reference should be made to the appended claims and their equivalents in determining the scope of the instant disclosure.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind." Unless otherwise noted, the terms "connected to," "coupled to," and "attached to" (and their derivatives), as used in the specification and claims, are to be construed as permitting both direct and indirect (i.e., via other elements or components) connection. Furthermore, two or more elements may be coupled together with an adhesive, a clasp, a latch, a hook, a link, a buckle, a bolt, a screw, a rivet, a snap, a catch, a lock, or any other type of fastening or connecting mechanism.

What is claimed is:

1. A method for forming a fluidic device, the method comprising:
    forming a gate for the fluidic device out of a first material;
    forming a channel for the fluidic device out of a second material that is different than the first material;
    forming a force concentrator for the fluidic device out of a third material that is different than the first material and the second material, the force concentrator comprising a force reception surface that abuts a gate actuation membrane of the gate and a force concentration surface that is smaller than the force reception surface and that abuts the channel; and after forming the gate, the channel, and the force concentrator, forming the fluidic device by assembling a plurality of components including the gate, the channel, and the force concentrator.

2. The method of claim 1, further comprising, prior to forming the gate, the channel, and the force concentrator:
selecting the first material for the gate by selecting the first material based on a functionality of the gate;
selecting the second material for the channel by selecting the second material based on a functionality of the channel; and
selecting the third material for the force concentrator based on a functionality of the force concentrator.

3. The method of claim 1, wherein the gate is configured to module fluid flow in a channel of the fluidic device.

4. The method of claim 1, wherein the first material comprises a flexible plastic.

5. The method of claim 4, wherein the first material comprises a silicone elastomer.

6. The method of claim 1, wherein the channel is configured to transport fluid from a source, configured to act as an input for fluid to enter the channel, to a drain, configured to act as an output for fluid to exit the channel.

7. The method of claim 1, wherein the second material comprises a collapsible material.

8. The method of claim 7, wherein the collapsible material comprises a stretched polyester film.

9. The method of claim 1, wherein:
forming the gate out of the first material comprises using a first process to form the gate; and
forming the channel out of the second material comprises using a second process to form the channel that is different than the first process.

10. The method of claim 9, wherein:
forming the force concentrator out of the third material comprises using a third process to form the force concentrator that is different than the first process and the second process.

11. The method of claim 1, further comprising forming a casing out of a fourth material that is different than the first material and the second material.

12. The method of claim 1, wherein the third material comprises a rigid plastic.

13. A fluidic device comprising a plurality of components assembled after being formed, the plurality of components comprising:
a channel, formed from a first material, configured to transport fluid from a source to a drain, wherein the source is an input for the fluid to enter the channel, and the drain is an output for fluid to exit the channel;
a gate, formed from a second material that differs from the first material, configured to modulate fluid flow in the channel; and
a force concentrator, formed from a third material that differs from the first material and the second material, which is configured to compress the channel and which comprises a force reception surface that abuts a gate actuation membrane of the gate and a force concentration surface that is smaller than the force reception surface and that abuts the channel.

14. The fluidic device of claim 13, wherein:
the first material comprises a flexible plastic;
the second material comprises a collapsible plastic; and
the third material comprises a rigid plastic.

15. A haptic device comprising:
at least one fluidic device comprising a plurality of components assembled after being formed, the plurality of components comprising:
a channel, formed from a first material, configured to transport fluid from a source to a drain;
a gate, formed from a second material that differs from the first material, configured to modulate fluid flow in the channel; and
a force concentrator, formed from a third material that differs from the first material and the second material, which is configured to compress the channel and which comprises a force reception surface that abuts a gate actuation membrane of the gate and a force concentration surface that is smaller than the force reception surface and that abuts the channel.

16. The haptic device of claim 15, wherein:
the haptic device further comprises an actuator, a controller, and one or more sensors; and
at least one of the actuator, the controller, or the one or more sensors is composed of a group of fluidic devices that includes the at least one fluidic device.

17. The haptic device of claim 16, wherein the group of fluidic devices are coupled together to form a composite fluidic device.

18. The haptic device of claim 15, wherein the haptic device comprises a haptic glove configured to operate within a virtual reality system.

19. The haptic device of claim 18, wherein the virtual reality system comprises:
a head-mounted display;
an imaging device;
the haptic device; and
a console machine coupled to the head-mounted display, the imaging device, and the haptic device.

20. The haptic device of claim 19, wherein the haptic device is configured to:
send action requests, initiated by a user wearing the haptic glove, to the console machine; and
provide haptic feedback, based on a haptic feedback signal received from the console machine, to the user as the user interacts with virtual objects in the virtual reality system.

* * * * *